United States Patent [19]
Fouche

[11] Patent Number: 4,928,561
[45] Date of Patent: May 29, 1990

[54] METHOD AND APPARATUS FOR ULTRA-PRECISE MACHINING APPLIED TO EXECUTING ATYPICAL SURFACES OF REVOLUTION AND TO SERVO-CONTROLLED MACHINING

[75] Inventor: Claude Fouche, Gasny, France

[73] Assignee: S.A.: Societe Europeenne de Propulsion, Suresnes, France

[21] Appl. No.: 224,778

[22] PCT Filed: Nov. 13, 1987

[86] PCT No.: PCT/FR87/00447
§ 371 Date: Aug. 31, 1988
§ 102(e) Date: Aug. 31, 1988

[87] PCT Pub. No.: WO88/03459
PCT Pub. Date: May 19, 1988

[30] Foreign Application Priority Data
Nov. 13, 1986 [FR] France .................. 86 15763

[51] Int. Cl.⁵ .................. F16C 39/06
[52] U.S. Cl. .................. 82/1.11; 82/147; 310/90.5
[58] Field of Search .................. 310/90.5; 82/147, 1.2, 82/1.11, 12, 147, 151, 903

[56] References Cited
U.S. PATENT DOCUMENTS 4,114,960 9/1978 Habermann .................. 308/10
4,180,946 1/1980 Heijkenskjold .................. 310/90.5
4,794,290 12/1988 Nagasaka .................. 310/90.5
4,839,550 6/1989 Mizuno .................. 310/90.5

FOREIGN PATENT DOCUMENTS 2214890 8/1974 France .
150616 11/1981 Japan .................. 310/90.5
58-54220 3/1983 Japan .................. 310/90.5
57-65415 4/1983 Japan .................. 310/90.5
86/01862 3/1986 World Int. Prop. O. .................. 82/147

Primary Examiner—Frederick R. Schmidt
Assistant Examiner—Blynn Shideler
Attorney, Agent, or Firm—Poms, Smith, Lande & Rose

[57] ABSTRACT

According to the method of machining on ultra-precise surface of revolution (240) on a workpiece (204) held in position by means of a workpiece-carrier spindle assembly (1) whose spindle is mounted on a spindle slide (202) by means of active magnetic bearings, the natural frequencies of the bearing servo-control are adjusted to values which are less than about 80 Hz, and the speed of spindle rotation is adjusted to a value of about 20 Hz to about 75 Hz, the radial and axial positions of the spindle are selectively modified about a nominal position by applying variable reference voltages to the circuits controlling the magnetic bearings, said voltages being varied as a function of control signals which are delivered as a function of the position of the tool (207), and displacement of the spindle slide (202) is inhibited so long as the control signals are less than predetermined values lying within the dynamic range of the magnetic bearings. The invention is particularly suitable for machining atypical surfaces of revolution by copying a master template.

13 Claims, 8 Drawing Sheets

Fig_1

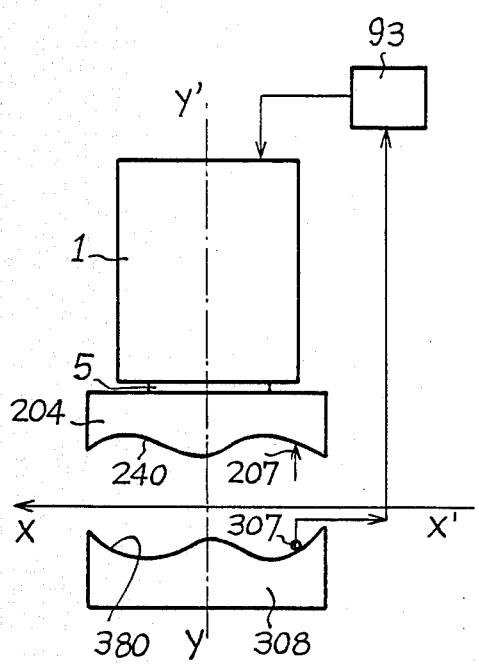
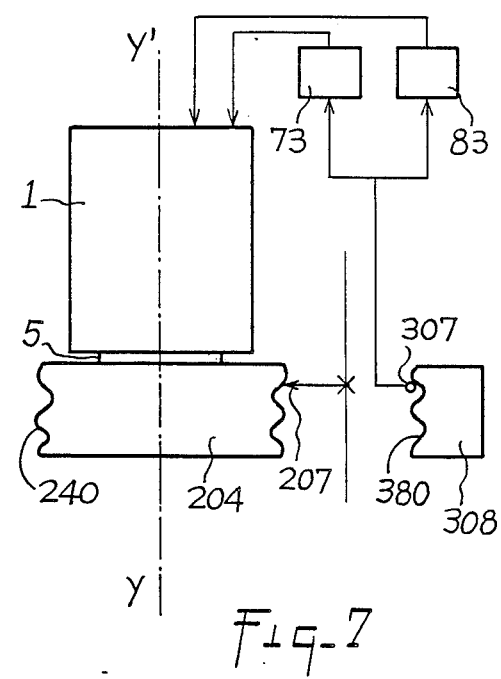
Fig-6    Fig-7
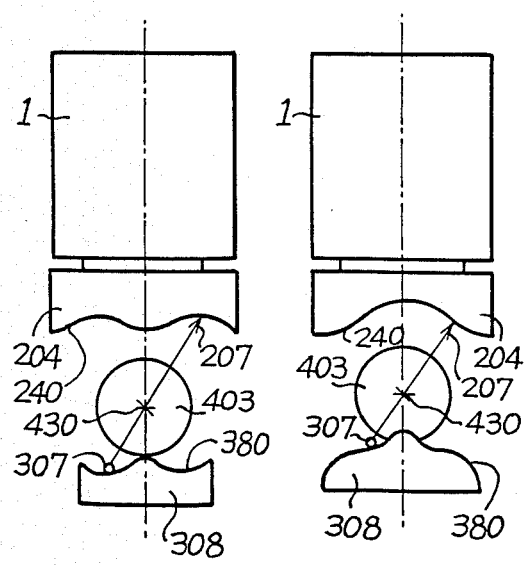
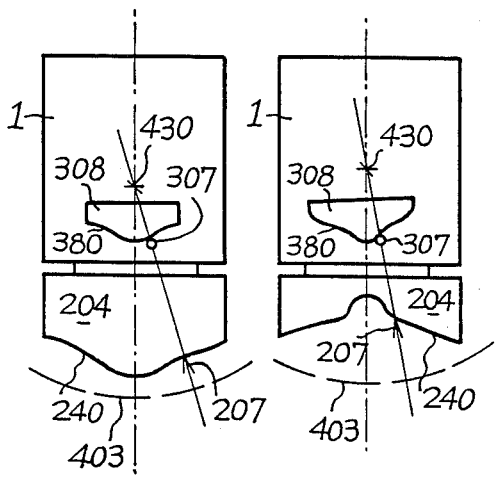
Fig-8    Fig-9    Fig-10    Fig-11

Fig_12

METHOD AND APPARATUS FOR ULTRA-PRECISE MACHINING APPLIED TO EXECUTING ATYPICAL SURFACES OF REVOLUTION AND TO SERVO-CONTROLLED MACHINING

The present invention relates to an apparatus for machining typical and atypical ultra-precise surfaces of revolution, the apparatus comprising tool guide means displaceable in translation along a predetermined direction or in rotation about a predetermined axis of rotation in order to position a tool, a spindle slide for guiding a workpiece-carrier spindle assembly along an axis, first and second sensors for measuring displacement respectively of the spindle slide and of the tool guide means, and means for displacing the tool guide means at a determined speed corresponding to a given machining frequency.

High precision machine tools for machining complex surfaces using cartesian co-ordinates or polar co-ordinates make use of a workpiece-carrier spindle assembly mounted on a slide and generally under the control of a screw-and-nut system associated with a D.C. electric motor whose rotor is directly coupled to the slide drive screw. The spindle on which the workpiece is fixed is itself mounted in the spindle assembly by means of air bearings which confer a high degree of stiffness to the spindle.

The use of air bearings requires very small gaps between the spindle and its stator, said gaps being about 5 µm across. However, this does not eliminate precision-limiting residual disturbance movements in the spindle, particularly since slide defects can never be totally eliminated.

Proposals have already been made to rectify workpieces mounted on active magnetic bearings in order to obtain a high degree of precision and stability in the control of workpiece rotation. However, this implies that removable magnetic bearings are available, which is applicable to making workpieces of certain shapes only.

U.S. Pat. No. 4,180,946 corresponding to French patent number 75 30209 describes a tool-carrier spindle assembly in particular for a rectifier, in which the spindle is mounted in active radial bearings and which includes an electric drive motor incorporated in the stator of the spindle assembly and situated between the two end radial bearings. Although such a tool-carrier spindle assembly provides a degree of flexibility in use for performing a certain number of machining operations, it is not suitable for being incorporated in the architecture of a very high precision machine tool.

The present invention seeks to remedy the above drawbacks and to make it possible to perform a variety of very high precision machining work for the purpose of making surfaces which are typical or atypical and having the general shape of a surface of revolution, using a machine which is very flexible in use and capable of being adapted to performing various high quality special tasks.

These objects are achieved by means of an ultraprecise machining apparatus of the type mentioned at the beginning of the description, characterized in that the workpiece-carrier assembly comprises a stator fixed to the spindle slide and a spindle mounted in the stator by means of an active magnetic suspension having five servo-controlled axes and comprising at least two radial bearings and an axial bearing, in that the radial and axial magnetic bearings are servo-controlled at natural frequencies which are less than about 80 Hz, in that means are provided for rotating the spindle of the assembly at a predetermined speed less that the natural frequencies and lying between about 20 Hz and about 75 Hz, and in that it further comprises means for applying variable reference voltages to the servo-control circuits of the radial and axial magnetic bearings, which reference voltages are varied as a function of machining control signals for the purpose of selectively modifying the radial and axial positions of the spindle of the workpiece-carrier assembly about a nominal position, and means for authorizing displacement of the spindle slide only when said control signals exceed predetermined values.

The invention also provides a method of machining an ultra-precise surface of revolution on a workpiece held in position by a spindle which is mounted via a five-axis active magnetic suspension in a workpiece-carrier spindle assembly which is itself mounted on a spindle slide for providing guidance along an axis Y'Y, with machining being performed by means of a tool positioned on mechanical tool guide means which are displaceable in translation along a predetermined direction or in rotation about a predetermined axis of rotation, the method being characterized in that it consists in:

(a) servo-controlling the radial and axial active magnetic bearings of the magnetic suspension with natural frequencies of less than about 80 Hz;

(b) rotating the spindle at a predetermined speed which is less than the natural frequencies and which lies between about 20 Hz and 75 Hz, and preferably between about 20 Hz and 40 Hz;

(c) permanently monitoring the displacements of the spindle slide and the tool guide means by means of displacement sensors;

(d) selectively modifying the radial and axial positions of the spindle about a nominal position within the spindle assembly by applying reference voltages to the control circuits of the radial and axial magnetic bearings, which reference voltages varied as a function of control signals which themselves depend on the position of the tool;

(e) inhibiting displacement of the spindle slide when said control signals are less than predetermined values; and (f) displacing the tool guide means at a determined speed corresponding to a given machining frequency.

When the control signals are greater than said predetermined values, displacement of the spindle slide is initially controlled as a function of said control signals depending on the position of the tool, after which stage (d) is implemented using, as the control signals, signals representative of the position or speed error of the spindle slide relative to the required control.

In a first series of applications of the method of the invention, said machining control signals depending on the position of the tool are delivered by a displacement sensor fixed to the tool guide means and disposed in a vertical plane containing the axis of the tool, and in that a reference workpiece or template including a reference surface to be copied on the workpiece to be machined is disposed in a fixed position facing said displacement sensor.

More particularly, the signals emitted by the displacement sensor are processed to generate control signals for the purpose of forming a surface on the workpiece to be machined which is a geometrical transformation of the reference surface to be copied, e.g. a surface which is complementary to said reference surface or a surface which is geometrically similar thereto or an anamorphosis thereof.

In a second series of applications of the method of the invention, said control signals depending on the position of the tool are delivered from a memory which stores the co-ordinates of various points of the sampled meridian of a reference workpiece to be reproduced.

In this case, in a more particular application, depending on the position of the tool, a memory is read to obtain firstly the co-ordinates of the point corresponding to the sampled meridian of a reference workpiece to be reproduced, and secondly the speed of displacement of the tool guide means and the speed of displacement of the spindle slide, the real speed of displacement of said tool guide means is detected by means of a first sensor, the real displacement speed of said spindle slide is detected by means of a second sensor, the measured values of the displacement speeds and the speeds read from the memory corresponding to the tool position under consideration are compared, and in the event of a difference between a measured value and a value read from the memory, the radial and/or the axial displacement, as the case may be, of the spindle of the workpiece-carrier assembly is speed controlled in such a manner as to cancel said speed difference.

In a third series of applications of the method of the invention, said spindle position control signals are constituted by periodic signals of predetermined amplitude and frequency.

In this case, the periodic spindle position control signals may have a frequency which is less than said machining frequency, thereby forming a surface which is convex or concave.

The periodic spindle position control signals may be at a frequency which is greater than said machining frequency, but less than said speed of spindle rotation, thereby forming spirals on the surface to be machined, said spirals being of controllable amplitude and constituting roughness standards.

The periodic spindle position control signals may be at a frequency which is a multiple of the speed of rotation of the spindle, thereby forming radiating fluting on the workpiece to be machined.

The control signals used in the present invention may thus stem from various different origins:

(1) They may be predetermined to be suitable for providing variants, such as bulging, fluting, spiralling, rounding, or filleting, based on simple shapes or on shapes generated by a mechanical template or on a computer template;

(2) For servo-controlled machining, they may be the result of the measured residual error between the mechanical template or the computer template and the real position of the slide being controlled (for example the spindle slide), with said slide being controlled to follow said template by a conventional servo-control method;

(3) They may result from the error between a predetermined speed vector and the speed vector of relative displacement of the tool over the workpiece being machined; and (4) They may result from a signal delivered by a sensor reading a mechanical template or from a signal emitted by a computer and representative of the workpiece to be machined within a range of ±150 μm.

The control signals may also come from a combination of various signals taken from the above-mentioned categories.

The method and the apparatus of the invention make it possible to obtain performance lying in the domain of optical precision. Thus, by way of example, workpieces machined in accordance with the invention using a workpiece-carrier spindle mounted on servo-controlled magnetic bearings have made it possible to obtain cylindrical workpieces in which departures from true are less than one tenth of a micron. In particular, a machined piece of AG5 aluminum alloy having a diameter of 220 mm has a peak-to-peak error of 0.1 μm, and a machined piece of germanium having a diameter of 55 mm has a peak-to-peak error of 0.089 μm.

Plane pieces also have very small departures from planeness. Thus, pieces having a diameter of 105 mm and made of germanium or of AG5 aluminum alloy have form errors relative to a plane of $\lambda/8$ and $\lambda/2.3$ respectively (where $\lambda = 0.6320$ μm).

Other characteristics and advantages of the invention appear from the following description of particular embodiments given by way of example, with reference to the accompanying drawings, in which:

FIGS. 6 and 7 are diagrams showing how surfaces of revolution may be machined by copying in a system of cartesian axes;

FIGS. 8 to 11 are diagrams showing how surfaces of revolution may be machined by copying in a system of polar co-ordinate axes;

Figure 12:
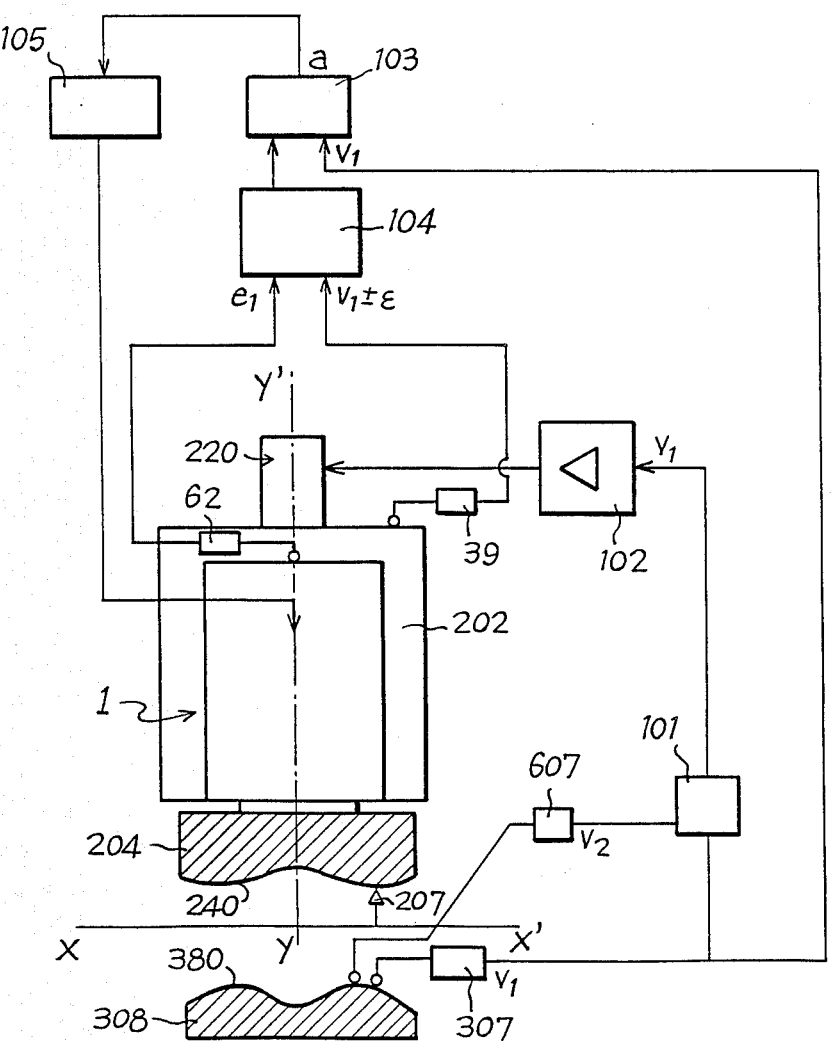
FIG. 12 is a diagram similar to FIG. 6 but in which the circuits for controlling the position of the workpiece-carrier are shown in greater detail.
Figure 13:
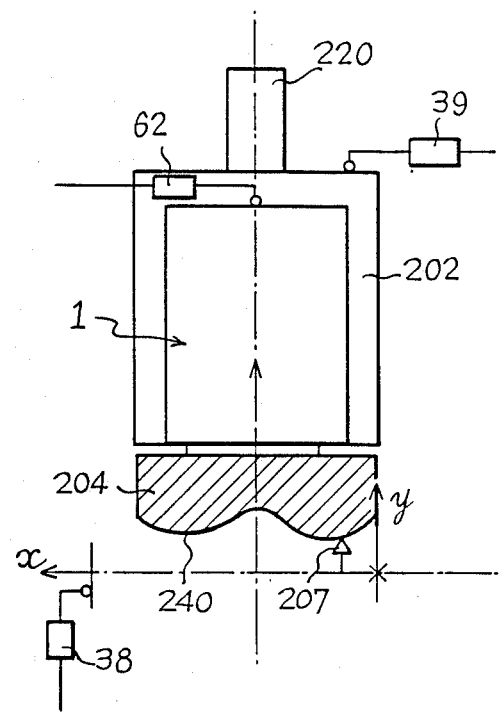
Figure 14:
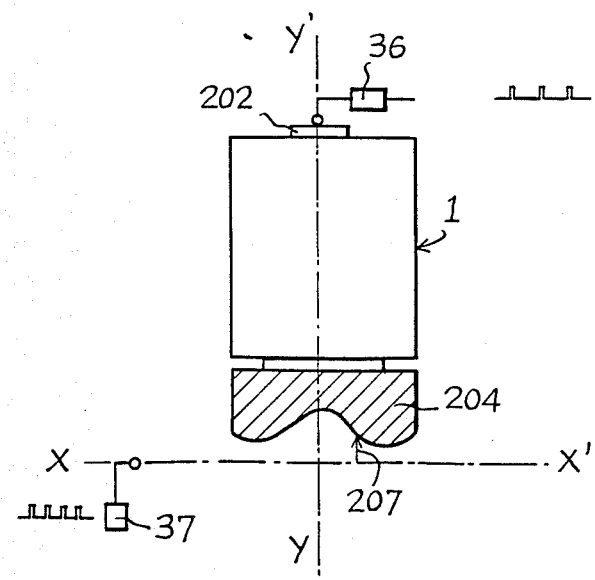

FIG. 13 corresponds to an embodiment analogous to that shown in FIG. 12, but in which the characteristics of the surfaces to be machined are synthesized in a computer memory; and FIG. 14 corresponds to an implementation similar to FIG. 13, but in which machining speeds are monitored.

Figure 1:
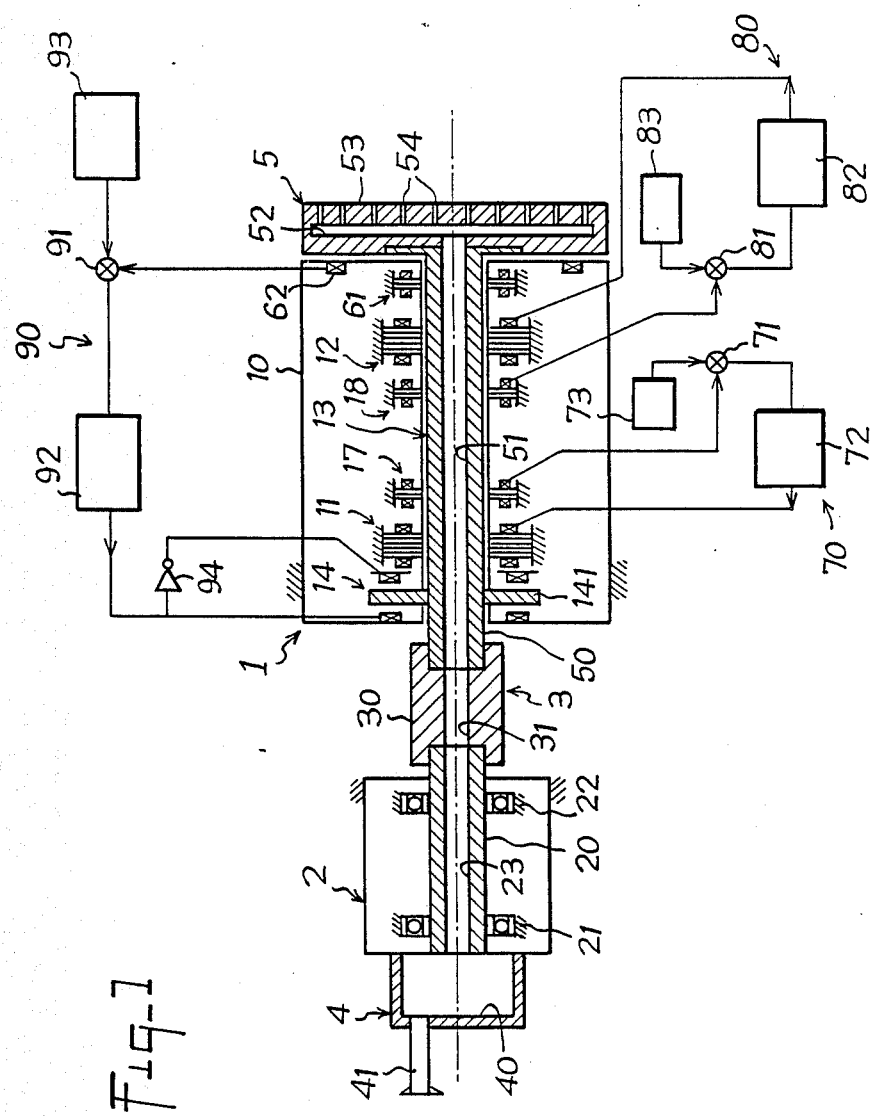
FIG. 1 is a diagrammatic axial section through a workpiece-carrier spindle assembly having active magnetic bearings and usable in the present invention.

FIG. 1 is a diagram showing the overall structure of a workpiece-carrier assembly 1 having active magnetic bearings and suitable for mounting on a slide in a high precision machine tool and for performing the present invention.

Figure 2:
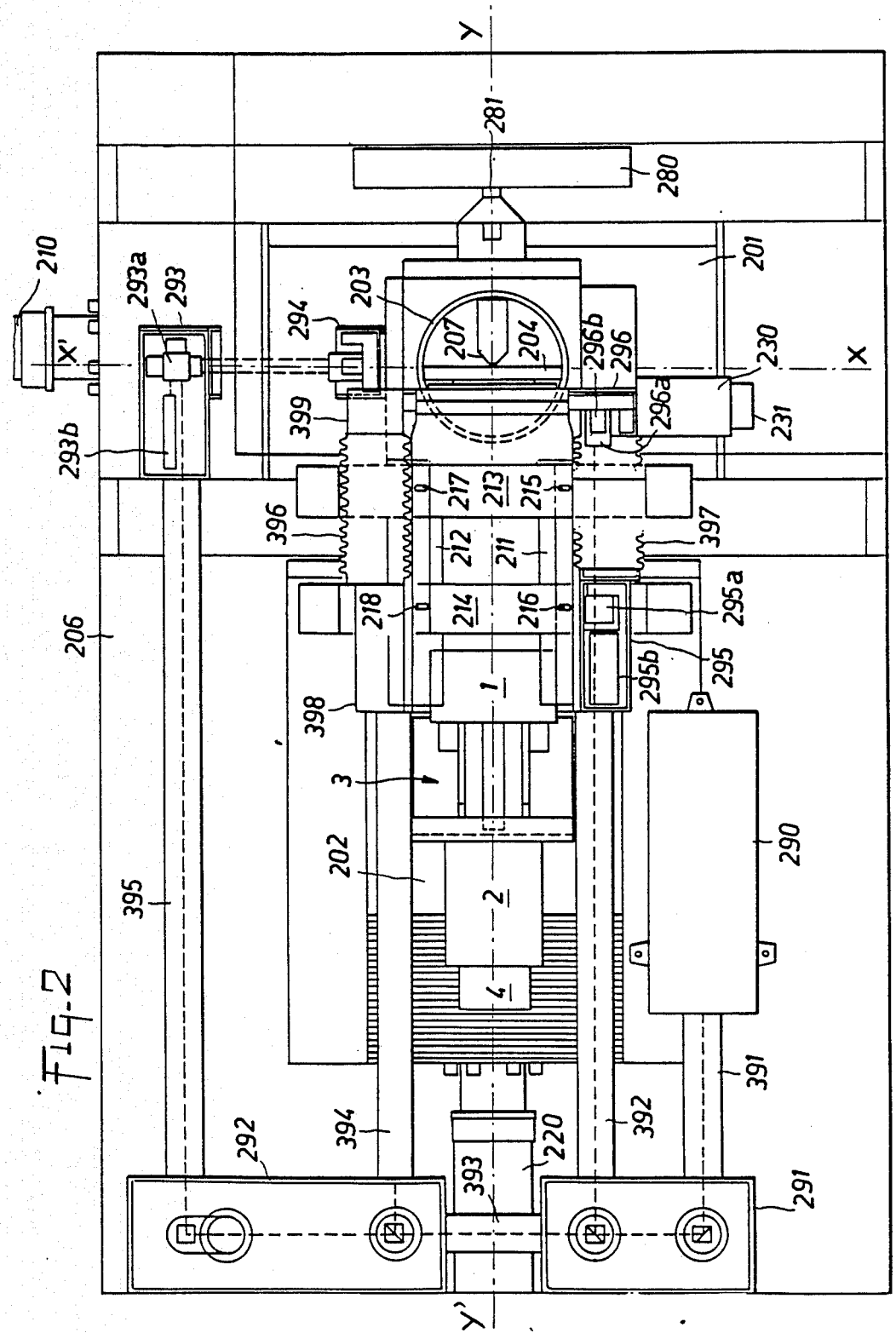
FIGS. 2 and 3 are a plan view and an elevation view respectively of an example of a machine tool using a system of orthogonal co-ordinate axes and to which the invention is applicable.
Figure 3:
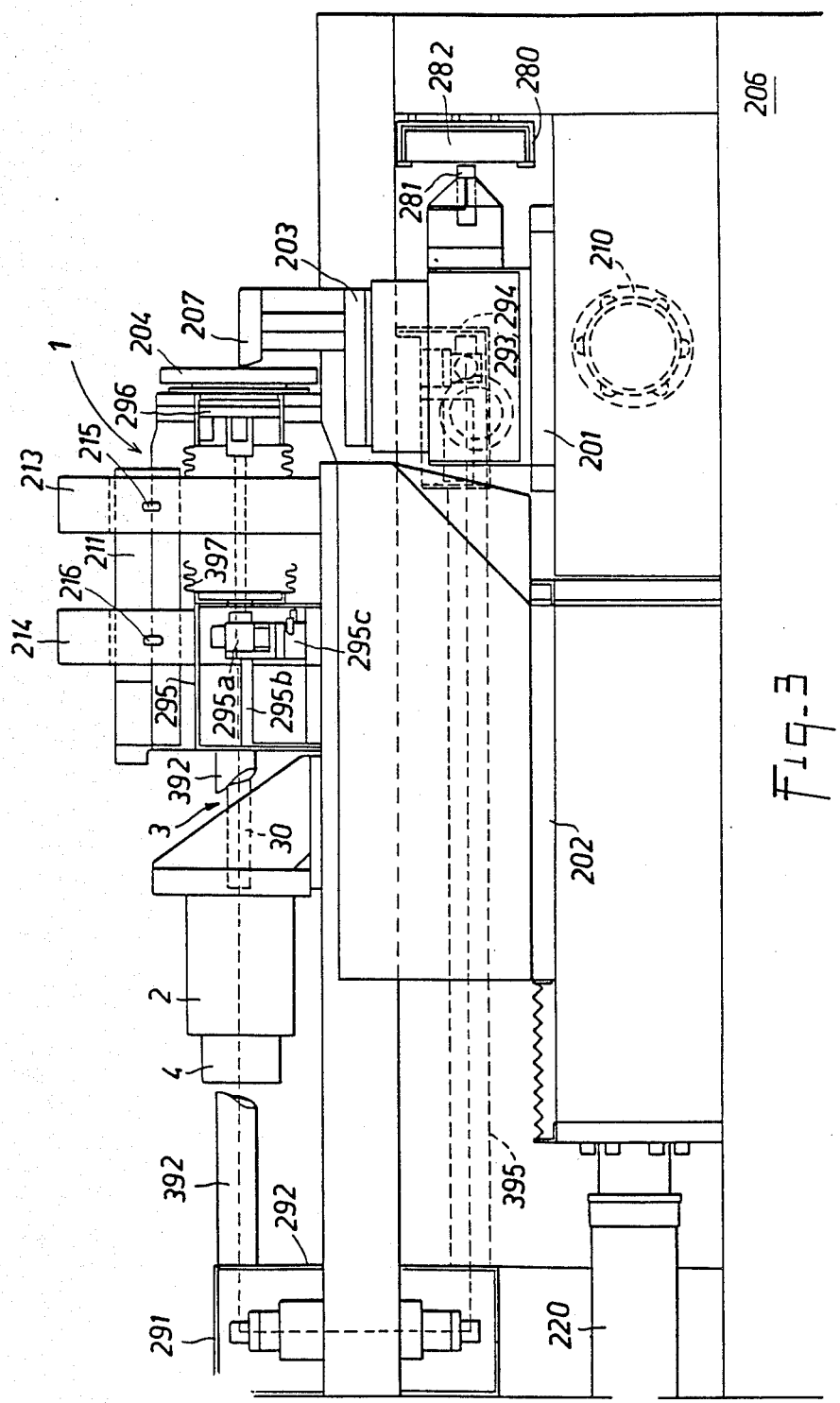
Figure 4:
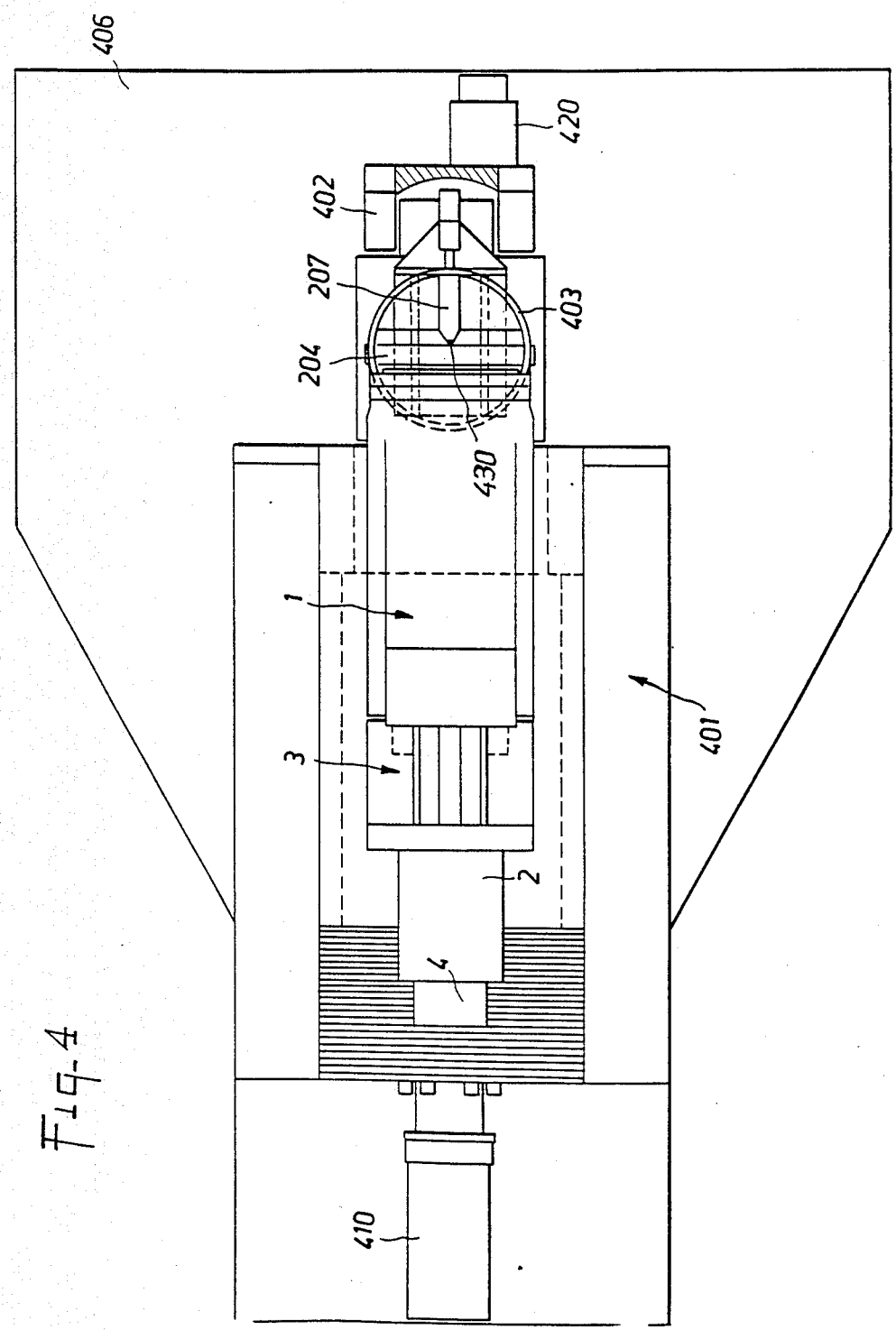
FIGS. 4 and 5 are a plan view and an elevation view respectively of an example of a machine tool using a system of polar co-ordinate axes, and to which the invention is applicable.
Figure 5:
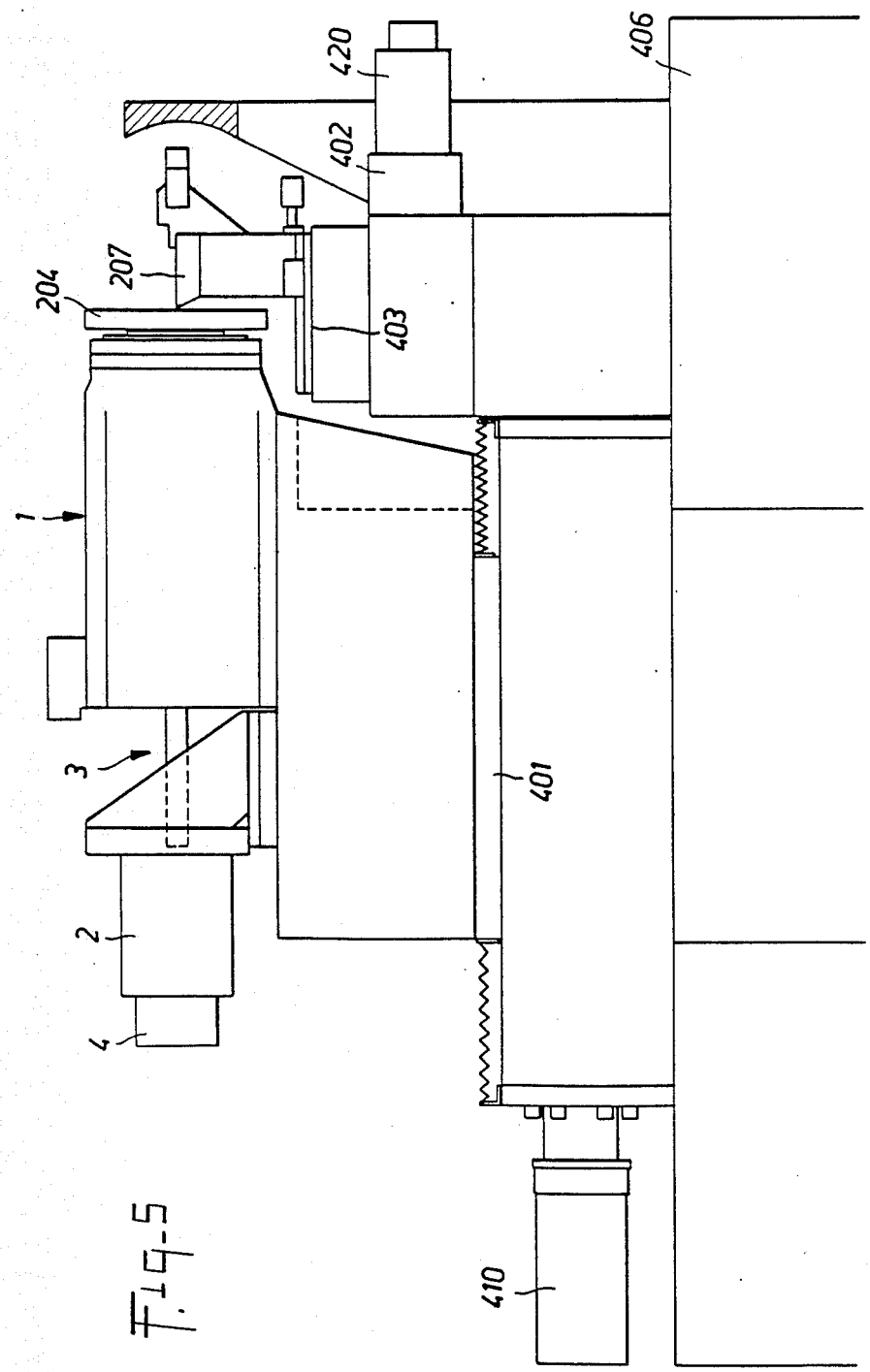

The spindle assembly 1 comprises a stator 10 which is fixed to a slide such as the slide referenced 202 in FIGS. 2 and 3, or 401 in FIGS. 4 and 5. The spindle assembly stator 10 houses the stator components of a front radial magnetic bearing 12 and of a back radial magnetic bearing 11 which define relatively large gaps 13 (about 0.3 mm) relative to the spindle 50 of the assembly 1. The stator 10 also includes the stator components of an axial magnetic bearing which co-operates with a disk 141 fixed to the rear portion of the spindle 50 and extending perpendicularly to the axis thereof in order to constitute an axial abutment.

The spindle 50 is terminated at its front end by a workpiece-carrier chuck 5 which is disposed coaxially with the assembly 1 and which has a greater diameter than the spindle 50. In the preferred case shown in FIG. 1, where the chuck 5 is a suction plate, the workpiece-carrier chuck 5 has a cavity 52 which is in communication with a duct 51 extending axially along the spindle 50. Orifices 54 are distributed over the front face 53 of the workpiece-carrier disk 5 and open out into the cavity 52 in order to hold a workpiece to be machined in contact with the front face 53 of the workpiece-carrier disk 5 by means of suction.

The spindle 50 is driven by an electric motor 2 which is external to the stator 10 of the spindle assembly and which has a rotor 20 suitable for mounting on precision ball bearings 21 and 22, on conical bearings, or on magnetic bearings. The external motor 2 is designed so as to have eccentricity which does not exceed a few microns.

The spindle 50 and the rotor 20 of the external motor 2 are interconnected by a coupling 3 for transmitting motor drive while filtering the mechanical disturbances due to motor eccentricity.

The coupling device 3 is advantageously constituted by a pipe 30 made of elastomer or other material having similar resilient properties, and it is fixed in airtight manner on the free ends of the spindle 50 and of the rotor 20 of the motor 2. Such a coupling guarantees airtightness in the connection between the motor 2 and the spindle 50 without requiring additional gaskets, and while providing the above-mentioned mechanical functions in a manner which is entirely satisfactory.

A duct 31 extends axially inside the coupling and provides continuity between the duct 51 in the spindle 50 and a duct 23 extending axially along the rotor 20 of the motor 2. The duct 31 is made in such a manner as to ensure continuity of airtight sealing between the ducts 23, 31, and 51.

A suction housing 4 delimiting a distribution chamber 40 is applied to the rear of the motor 2 and is rigidly fixed to the stator thereof. The chamber 40 communicates firstly with a vacuum pump (not shown) via a pipe 41, and secondly with the duct 23 extending along the rotor 20 of the motor 2. With such an arrangement, the largest leaks from the outside into the suction circuit constituted by the chamber 40, the ducts 23, 31, and 51, and the chamber 52 are situated at the gap between the rotor 20 of the motor 2 and the stator of said motor. Given the small sizes of this gap (about 0.1 mm), head loss due to such leakage is relatively low. It is therefore not necessary to install a chicane baffle or other rotary seal which are always difficult to implement and which always give rise to axial vibration.

Given the presence of the coupling 3, the suction system which conveys pumping to the chamber 52 of the workpiece-carrier plate 5 from the vacuum pump via the spindle 50, the coupling 3 comprising an elastomer pipe or a metal bellows, the rotor 20 of the motor 2, and the suction housing 4, guarantees that all of the inevitable mechanical disturbances due to pumping, and in particular disturbances in the axial direction, are completely absorbed by the motor 2 and are not transmitted to the spindle 50.

The absence of an electric motor incorporated between the radial bearings, and the absence of any pumping performed immediately behind the spindle 50 make it possible to use a spindle 50 which is short and compact, thereby conferring greater stiffness and stability to the spindle.

The magnetic suspension of the spindle 50 inside the stator 10 comprises first and second radial active magnetic bearings 11 and 12 disposed respectively near the back and near the front of the stator 10. Each radial magnetic bearing 11 and 12 comprises, in conventional manner, a stator constituted by windings and a stack of laminations, and a magnetic circuit fixed to the spindle 50. Each radial bearing 11 and 12 is described as being active because it is associated with a servo-control loop 70 or 80 and with at least one detector disposed in the vicinity of the corresponding radial bearing and serving to detect the radial position of the spindle 50. Said detectors are referenced 17, 18, and 61. As is conventional with active magnetic bearings, the radial detectors 17, 18, and 61 may be of the inductive type having a stator magnetic circuit and winding disposed facing an annular reference track formed on the spindle 50. Advantageously, the detectors 17, 18, and 61 are constituted by harmonic rejection radial detectors as described in French patent number 2 214 890.

Given the application of the workpiece-carrier spindle assembly 1 to very high precision machine tools, it is necessary to rectify the spindle 50 in order to improve its geometrical tolerances (concentricity of the bearings and of the detectors), and also to improve the circularity of the detector tracks and of the bearings.

FIG. 1 shows the servo-control loops 70 and 80 associated with the radial bearings 11 and 12, and the servo-control loop 90 associated with the axial bearing 14, in a highly diagrammatic manner. Although the servo-control loops 70 and 80 are shown in the form of mutually independent servo-control circuits, interactions between them may naturally exist, as described in U.S. Pat. No. 3,787,100, for example.

In each of the servo-control loops 70 and 80, the signals delivered by at least one of the radial detectors 17 and 18, or 61 as the case may be, are compared by a subtractor 71 or 81 with a reference voltage provided by a circuit 73 or 83. The error signal delivered by the subtractor 71 or 81 is applied to a processing and amplifier circuit 72 or 82 which delivers an output signal for driving the windings of the corresponding radial bearing 11 or 12. Similarly, the signals delivered by the axial detector 62 are compared in a subtractor 91 with a reference voltage provided by a circuit 93. The error signal from the subtractor is applied to a processing and amplifier circuit 92 whose output signals are used to drive the windings of the axial abutment 14, either directly, or else after sign inversion by means of an inverter 94.

As explained below, the circuits 73, 83, and 93 serve to generate reference electrical voltages which are used to define the nominal position of the spindle 50 relative to its stator 10. This nominal position may vary about a central position where the gaps are of equal values throughout, and deliberately off-axis positions where the gaps have local minimum values which may be down to about one half of the gap which exists when the spindle is accurately centered. The effect of the reference voltages provided by the circuits 73, 83, and 93 is not only to correct for defects due to mechanical parts external to the spindle itself, but also to accurately define particular positions of the workpiece-carrier 5, and thus of the workpiece to be machined.

In accordance with the present invention, the servo-control natural frequencies are chosen to be less than 80 Hz and lie between about 50 Hz and 60 Hz, for example, and the workpiece-carrier spindle is rotated at a speed lying between about 20 revolutions per second (Hz) and 75 Hz, and preferably between 25 Hz and 40 Hz in the present example. The servo-control loops have gain maxima at least for the first harmonic of the speed of rotation and, where appropriate, for the first two or three harmonics since these harmonics constitute the vibration frequencies the machining spectrum having the greatest amplitudes.

Examples of very high precision machine tools having the workpiece-carrier spindle assembly 1 of FIG. 1 installed thereon are now described.

A first example of a machine for machining complex surfaces in a cartesian frame of reference XX', YY' is shown in FIGS. 2 and 3.

Two slides 201 and 202 having perpendicular displacement axes XX' and YY' are placed on a support 206 such as a block of granite which is decoupled from the ground by means of a pneumatic suspension.

The slide 201 supports a turntable 203 on which a tool 207 is placed, while the slide 202 supports a workpiece-carrier spindle assembly 1 which may be as described above. The workpiece 204 to be machined is placed on the workpiece-carrier disk at the front of the assembly 1.

The turntable 203 serves to orient the tool in such a manner that it is always the same portion of its cutting edge which is used for machining, thereby avoiding the effects of any geometrical irregularities that may exist at said edge.

D.C. electric motors 210 and 220 drive respective screw-and-nut systems for displacing each of the slides 201 and 202. The slides 201 and 202 are displaced under numerical control and displacement thereof is measured by a conventional Doppler interferometer device.

The interferometer device is essentially constituted by a laser source 290, housings 291 and 292 containing rectroreflection cubes, a plane mirror housing 294, and an interferometer housing 293 for measuring displacement of the tool slide 201, two plane mirror housings 296 and 399, and two interferometer housings 295 and 398 for measuring displacement of the spindle slide 202, bellows 397 and 396 for providing connections between the interferometer housings 295 & 398 and the plane mirror housings 296 & 399, and tubes 391 to 395 for protecting the measurement laser beams. Each of the plane mirror housings 294, 296, or 399, such as the housing 296, contains a plane mirror 296a and adjusting stops 296b. Each of the interferometer housings 293, 295, or 398 includes a measuring interferometer 293a, 295a, a receiver 293b, 295b, and an adjustment device such as 295c.

In order to ensure that the machined surfaces are correct, it is necessary for the spindle to rotate without eccentricity and also for the displacement of the spindle to be performed with precision, and it is therefore necessary to detect movements of the spindle slide 202 and to perform corrections by displacing the spindle 50 radially. This type of correction may be as much as ±150 μm, which is considerable. In order for the defects generated by displacement of the two carrier slides 201 to have no effect on the workpiece to be machined, it is also necessary to be able to detect movement of the slide 201 at the tool in order to intervene axially on the spindle 50. This correction may be as much as 150 μm.

The workpiece-carrier spindle assembly 1 also serves to compensate for defects in the mechanical elements of the machine tool. By acting on the servo-control loops of the magnetic bearings in the workpiece-carrier spindle assembly 1, it is possible to keep the axis of the spindle accurately positioned in spite of roll, pitch, or yaw defects and rectituded defects due to the displacements of either of the slides 201 and 202.

This compensation can be performed in real time providing each of the servo-control planes of the radial magnetic bearings 11 and 12 is provided with two detectors, e.g. capacitive type detectors 216 & 218 or 215 & 217 which are mounted on brackets 214, 213 fixed to the spindle assembly stator 10 and which serve to detect changes in distance relative to fixed plane reference surfaces 211 and 212 placed parallel to the displacement direction YY' of the spindle-carrier slide 212. The surfaces 211 and 212 which are perpendicular to the servo-control axes are at an angle close to 45° relative to the support plane of the spindle assembly 1.

The plane reference surface 211 is common to the detectors 215 and 216, while the plane reference surface 212 is common to the detectors 217 and 218. The plane reference surfaces 211 and 212 are preferably constituted by metallized mirrors.

The signals coming from the detectors 215 to 218 are processed and applied to respective corresponding radial bearing servo-control loops in order to modify the reference voltages which determine the position of the axis of the spindle 50 relative to the stators of the magnetic bearings 11 and 12.

Turning now to the tool 207 placed on its slide 201, in order to guarantee that the tip of the tool 207 remains in a plane perpendicular to the axis of the spindle 1 when the slide 201 is activated, it is necessary to provide a detector 281 in the vertical axial plane of the tool 207. This detector 281 is fixed to the slide 207 and measures proximity variations with a reference plane surface 282 which has previously been placed perpendicularly to the axis of the spindle 50. The detector 281 is preferably of the capacitive type and co-operates with a plane mirror 282 mounted in a fixed support 280.

The signal from the detector 281 is processed and then applied to the servo-control loop of the axial magnetic bearing 14 in order to modify its reference voltage which defines the actual position of the spindle 50 relative to the spindle assembly stator.

In FIG. 2, references 231 and 230 respectively designate a tachometer generator and the D.C. electric motor for rotating the turntable 203. An angle encoder is also associated with the turntable 203.

FIGS. 4 and 5 show an example of a polar type machine for machining complex surfaces, which machine comprises a horizontal axis spindle assembly 1 which may be the same as the above-described spindle assembly, placed on a slide 401 extending over a vertical axis turntable 403 having a slide 402 for a tool 203 disposed thereon. The supporting block 406, e.g. made of granite, is decoupled from the ground by a pneumatic suspension. The workpiece 204 is placed on the workpiece-carrier disk 5 of the spindle 1 as in the embodiment of FIGS. 2 and 3. The slide 402 is controlled by a screw-and-nut system driven by a D.C. motor 420.

If the displacements of the spindle 50 of the spindle assembly 1 within its magnetic bearings are programmed as a function of the rotation of the turntable 403, it is possible to obtain a surface on the workpiece 204 having special shapes.

The tool 207 may be placed perpendicularly to the surface to be machined, in a frontal position or, alternatively, it may be placed in a lateral position.

The overall structure of a polar type machine is simpler than that of a cartesian type machine and there is no need to use an interferometer measuring device as shown in FIGS. 2 and 3. This is because it is necessary during machining to verify rotation only since all of the other parameters depend on initial adjustments. A tachometer generator and an angle encoder associated with the turntable 403 thus provide all of the sensing required for machining operations.

By electrically imposing radial and axial displacements to a workpiece-carrier spindle having magnetic bearings disposed on a machine tool operating in a cartesian or a polar axis system, it is possible simultaneously to correct defects in the mechanical assemblies which move them in order to generate ultra-precise conventional surfaces of revolution (e.g. for spherical mirrors, optical lenses, seals, magnetic memory disks), and to directly obtain atypical surfaces whose general shape is that of a surface of revolution (for example roughness standards, or tracks for ball bearings or for roller bearings), or, as explained below with reference to FIGS. 6 to 14, to obtain arbitrary ultra-precise shapes of revolution by using a mechanical template or a computer template.

FIG. 6 is a symbolic diagram showing means which make it possible, in accordance with the invention, to machine a workpiece 204 having a surface 240 which constitutes the image or exact copy of a surface 380 on a reference or master workpiece 308 which has previously been machined by conventional means. The reference piece 308 is placed in such a manner that its surface 380 extends along the displacement direction XX' of the tool slide 201. A displacement sensor 307 mounted on the slide 201 in the axis of the tool 207 feels said surface 380 and measures its distance from the slide 201. The signal delivered by said sensor 307 is applied to the circuit 93 of the servo-control loop 90 for the axial bearing 14. The axial position of the spindle 50, and thus of the workpiece 204 to be machined, is modified relative to the axial position of the tool 207 as a function of the information provided by the sensor 307, thereby making it possible to copy the shape of the surface 380 of the template 308 with a high degree of accuracy.

FIG. 7 shows how a toroidal surface 240 can be machined by copying a reference surface 380 of a template 308 placed along the displacement direction of a tool slide, which in this case is parallel to the axis YY' of the spindle assembly 1. These means are similar to those used in the implementation of FIG. 6, however in this case the signals from the displacement sensor 307 are applied to the circuits 73 and 83 in the servo-control loops for the radial bearings 11 and 12 of the spindle assembly 1, instead of being applied to the circuit 93 of the servo-control loop 90 for the axial bearing 14, thereby enabling the radial position of the axis of the workpiece 204 to be modified as a function of the profile read from the template 308.

The signals delivered by the displacement sensor 307 may be processed in the circuit 93 or the circuits 73 and 83 so as to form a surface 240 on the workpiece to be machined 204 which constitutes a positive or a negative copy of the reference surface 380 or which has a shape that is amplified or reduced relative to the reference surface 380, thus providing a piece which is geometrically transformed relative to the reference piece, e.g. a piece which may be geometrically similar thereto or an anamorphosis thereof.

In a machine where machining is performed in a polar co-ordinate system, it is similarly possible to make copies 240 of reference shapes 380 by using signals delivered by a displacement sensor 307 mounted in a vertical plane containing the tool 207 and passing through the axis of rotation 430 of the turntable 403 supporting the tool 207. The signals delivered by the sensor 307 are applied to the processing circuit 93 of the servo-control loop 90 (FIGS. 8 to 11) as in the example shown in FIG. 6. Depending on how the signal from the sensor 307 is processed, the copy of the standard shape 380 may be made by establishing positive or negative differences between a perfect sphere and the workpiece 4 to be machined. A simple displacement of the spindle assembly slide relative to the turntable 403 can give rise to surfaces which are geometrically similar to the reference surface 380.

In the description relating to FIGS. 6 to 11, it is assumed that the offset of the meridian of the surface to be copied is less than the dynamic displacement range of the spindle, such that the workpiece 204 can be machined by acting solely on the servo-control loops 70, 80, and 90 of its magnetic bearings 11, 12, and 14.

However, the invention is also applicable to copying surfaces where the meridian offset is greater than the dynamic displacement range of the spindle 50. A main displacement is given by servo-controlling the slide and a correcting displacement is applied to the spindle.

As shown diagrammatically in FIG. 12, the signals V from the sensor 307 are applied to an electronic circuit 101 for controlling the stroke of the slide 202 and thus of the spindle 50, which circuit 101 itself feeds an electronic circuit 102 for controlling the drive motor 220 of the slide 202. When the signal V exceeds a threshold e of about $\pm 150$ $\mu$m, which corresponds to a limit to the axial range of dynamic displacement of the spindle 50 that can be performed by acting on the axial bearing 14, the signal V is used by the controlling circuit 101 to cause the drive motor 220 of the slide 202 to operate. The signal V coming from the detector is also applied to a first input of a subtractor circuit 103 whose second input receives the output signal from a two-input adder circuit 104. One of the inputs to the adder circuit 104 receives signals provided by a sensor 62 measuring the axial displacement $e_1$ of the spindle 50 relative to its stator, while the other input to the adder circuit 104 receives the signals $V+\epsilon$ (where $\epsilon$ is a positive or negative algebraic number) from a sensor 35 measuring the axial displacement of the slide 202. If the difference between the magnitude $V+\epsilon+e_1$ provided by the summing circuit 104 and the magnitude V provided by the sensor 307 is other than zero, then the subtractor circuit 103 delivers an error signal a which is applied to the circuit 105 for controlling the axial bearing 14 supporting the spindle 50 in order to cancel said error signal a. It is thus possible to perform fine and accurate adjustment of the position of the part 204 relative to the tool 207 on a permanent basis even when machining a workpiece whose shape is complex and exceeds the dynamic range of spindle displacement.

In a particular embodiment of the invention, a second displacement sensor 607 is placed in a position which is parallel to the first sensor 307 and which is offset a little way in the direction of displacement of the tool 207, and the signals V2 delivered by the second sensor 607 are compared with the signals V1 delivered by the first sensor, and when the absolute value of the difference between said signals $|V2-V1|$ exceeds a predetermined value e, the signals V1 delivered by the first sensor 307 are initially applied with a predetermined time constant to controlling the displacement of the spindle-carrier slide 202 or 401, whereas when the absolute value of the difference between said signals |V2−V1| is less than said predetermined value e, then the signals V1 delivered by the first sensor 302 are applied exclusively, with said predetermined time constant, to the circuits for controlling the radial magnetic bearings 11 and 12, and the axial bearing 14.

By using a displacement sensor 607 which feels the template 380 early, it is possible to provide effective stroke control regardless of the machining frequency, and only the predetermined time constants need to be adapted to the machining frequency.

Circuits analogous to those shown in FIG. 12 are naturally applicable to the embodiment shown in FIG. 7 which relates to machining cylindrical shapes.

When performing polar co-ordinate machining, as shown in FIGS. 8 to 11, pairs of servo-control circuits controlling the displacements of the spindle 50 and of the slide 202 may also be provided in a manner analogous to that shown in FIG. 12.

The invention also applies to copying surfaces which are synthesized by a computer program instead of being defined by a relevance piece 308.

In this case, the information concerning the surface to be machined is not provided by a sensor 307 feeling a reference surface, but is provided by computer means delivering data stored in a memory as a function of the position of the tool-carrier slide 201 as detected by a sensor 38.

FIG. 13 shows an embodiment which is entirely analogous to that of FIG. 12, but in which the meridian of the surface to be machined is synthesized in a computer in the form of a set of point co-ordinates, with the number of points being a function of the desired precision.

The computer controls the displacements to be performed by the spindle-carrier slide 202 and by the spindle 50 (depending on the dynamic range and on the accuracy of each of them) as a function of the displacement of the tool-carrier slide 201 as provided by the sensor 38. At a given point having X co-ordinate $x_i$, the computer compares the Y co-ordinate $y_i$ with the Y co-ordinate $y_{i-1}$ of the preceding point whose X co-ordinate was $x_{i-1}$. If the absolute value of the difference $|y_i - y_{i-1}|$ is greater than a threshold e corresponding to the dynamic range of the magnetic bearings, an instruction is sent to the spindle slide 202 in order to cause it to move and position itself at the value $y_i$.

The sensor 39 measures a value $y_i + \epsilon$, and then applies an instruction to the electronic circuits controlling the axial bearing 14. The spindle 50 moves through a distance $e_1$ as measured by the sensor 62 such that:

$$y_i \pm \epsilon + e_1 = y_i$$

The same method may be applied to surfaces whose general shapes are cylindrical or conical, and may be applied to point-by-point polar machining.

The present invention also makes it possible to monitor the speed of the tool 207 relative to the workpiece to be machined. This is illustrated in FIG. 14 which concerns an embodiment for machining a surface as synthesized in a computer.

The meridian is synthesized in a computer in the form of point co-ordinates (x, y), with a number of points being a function of the desired precision. The memory also stores speeds Vx, Vy for each point, which speeds correspond to the speeds of the tool slide 201 and of the spindle slide 202, respectively.

An accurate sensor 37 which provides pulses is placed on the tool slide 201.

At a given tool slide speed Vy, a frequency fy is obtained and the computer divides this frequency such that fx=fy/n if Vx=Vy/n, and compares this with the frequency provided by a sensor 36 placed on the spindle slide. Whenever a difference is observed, the spindle is speed controlled in such a way as to cancel the difference. The same device is also applicable to cylindrical shapes.

In the absence of a reference piece 204 or of a complete definition of the piece to be made in the form of a memory recording of the co-ordinates of points on a surface or of the meridian of a surface, special shapes may be machined by acting on the reference voltages provided to the circuits 73, 78, and 93 in the servo-control loops of the magnetic bearings.

In particular, if a periodically varying reference voltage is applied by the circuit 93 to the servo-control loop 90 of the axial bearing 14, then the spindle of the assembly 1 is displaced along its axis. The surface generated by displacing the workpiece 204 while the tool slide 201 is activated depends on the parameters adopted.

Thus, by taking "machining frequency" to be the reciprocal of the time taken by the tool to run along the radius of the workpiece, if the frequency of the reference voltage is less than the machining frequency, then a convex or a concave surface is obtained.

If the frequency of the reference voltage is less than the frequency of spindle rotation but greater than the machining frequency, then spirals of controllable amplitude are obtained and are suitable for constituting roughness references.

If the frequency of the reference voltage is equal to or greater than the frequency of spindle rotation, then radiating fluting is obtained.

By applying variable reference voltages which are adjustable or modulatable in amplitude and in frequency to the servo-control loops of the radial bearings via their circuits 73 and 83, it is similarly possible to machine very particular surfaces with great precision.

I claim:

1. A method of machining an ultra-precise surface of revolution on a workpiece held in position by a spindle which is mounted via a five-axis active magnetic suspension in a workpiece-carrier spindle assembly which is itself mounted on a spindle slide for providing guidance along an axis Y'Y, with machining being performed by means of a tool positioned on mechanical tool guide means which are displaceable in translation along a predetermined direction or in rotation about a predetermined axis of rotation, the method consisting in:

(a) servo-controlling the radial and axial active magnetic bearings of the magnetic suspension with natural frequencies of less than about 80 Hz;
   (b) rotating the spindle at a predetermined speed which is less than the natural frequencies and which lies between about 20 Hz and 75 Hz, and preferably between about 20 Hz and 40 Hz;
   (c) permanently monitoring the displacements of the spindle slide and the tool guide means by means of displacement sensors;
   (d) selectively modifying the radial and axial positions of the spindle about a nominal position within the spindle assembly by applying reference voltages to the control circuits of the radial and axial magnetic bearings, which reference voltages as varied as a function of control signals which themselves depend on the position of the tool;

(e) inhibiting displacement of the spindle slide when said control signals are less than predetermined values; and (f) displacing the tool guide means at a determined speed corresponding to a given machining frequency.

2. A method according to claim 1, wherein when the control signals are greater than said predetermined values, displacement of the spindle slide is initially controlled as a function of said control signals depending on the position of the tool, after which stage (d) is implemented using, as the control signals, signals representative of the positioning or speed error of the spindle slide relative to the required control.

3. A method according to claim 2, wherein said machining control signals depending on the position of the tool are delivered by a displacement sensor fixed to the tool guide means and disposed in a vertical plane containing the axis of the tool, and wherein a reference workpiece or template including a reference surface to be copied on the workpiece to be machined is disposed in a fixed position facing said displacement sensor.

4. A method according to claim 3, wherein a second displacement sensor is disposed in a position parallel to the position of the first sensor and slightly offset therefrom in the direction of tool displacement, with the signals V2 delivered by the second sensor being compared with the signals V1 delivered by the first sensor, and when the absolute value of the difference between said signals exceeds a predetermined value e the signals V1 delivered by the first sensor are initially applied, with a predetermined time constant, to controlling the displacement of the spindle slide, whereas when the absolute value of the difference between the signals remains less than said predetermined value e the signals V1 delivered by the first sensor are exclusively applied, with said predetermined time constant, to controlling the circuits of the radial and axial magnetic bearings.

5. A method according to claim 3, wherein the signals emitted by the displacement sensor are processed to generate control signals for the purpose of forming a surface on the workpiece to be machined which is a geometrical transformation of the reference surface to be copied, e.g. a surface which is complementary to said reference surface or a surface which is geometrically similar thereto or an anamorphosis thereof.

6. A method according to claim 5, wherein for each position of the tool a memory is read to obtain firstly the co-ordinates of the point corresponding to the sampled meridian of a reference workpiece to be reproduced, and secondly the speed of displacement of the tool guide means and the speed of displacement of the spindle slide, the real speed of displacement of said tool guide means is detected by means of a first sensor, the real displacement speed of said spindle slide is detected by means of a second sensor, the measured values of the displacement speeds and the speeds read from the memory corresponding to the tool position under consideration are compared, and in the event of a difference between a measured value and a value read from the memory, the radial and/or the axial displacement, as the case may be, of the spindle of the workpiece-carrier assembly is speed controlled in such a manner as to cancel said speed difference.

7. A method according to claim 1, wherein said control signals depending on the position of the tool are delivered from a memory which stores the co-ordinates of various points of the sampled meridian of a reference workpiece to be reproduced.

8. A method according to claim 1, wherein said spindle position control signals are constituted by periodic signals of predetermined amplitude and frequency.

9. A method according to claim 8, wherein the periodic spindle position control signals are at a frequency which is less then said machining frequency, thereby forming a surface which is convex or concave.

10. A method according to claim 8, wherein the periodic spindle position control signals are at a frequency which is greater than said machining frequency, but less then said speed of spindle rotation, thereby forming spirals on the surface to be machined, said spirals being of controllable amplitude and constituting roughness standards.

11. A method according to claim 8, wherein the periodic spindle position control signals are at a frequency which is a multiple of the speed of rotation of the spindle, thereby forming radiating fluting on the workpiece to be machined.

12. Apparatus for machining typical and atypical ultra-precise surfaces of revolution, the apparatus comprising tool guide means displaceable in translation along a predetermined direction or in rotation about a predetermined axis of rotation in order to position a tool, a spindle slide for guiding a workpiece-carrier spindle assembly along an axis, first and second sensors for measuring displacement respectively of the spindle slide and of the tool guide means, and means for displacing the tool guide means at a determined speed corresponding to a given machining frequency, wherein the workpiece-carrier assembly comprises a stator fixed to the spindle slide and a spindle mounted in the stator by means of an active magnetic suspension having five servo-controlled axes and comprising at least two radial bearings and an axial bearing, wherein the radial and axial magnetic bearings are servo-controlled at naturel frequencies which are less than about 80 Hz, wherein means are provided for rotating the spindle of the assembly at a predetermined speed less than the natural frequencies and lying between about 20 Hz and about 75 Hz, and wherein it further comprises means for applying variable reference voltages to the servo-control circuits of the radial and axial magnetic bearings, which reference voltages are varied as a function of machining control signals for the purpose of selectively modifying the radial and axial positions of the spindle of the workpiece-carrier assembly about a nominal position, and means for authorizing displacement of the spindle slide only when said control signals exceed predetermined values.

13. Apparatus according to claim 12, including means for causing the servo-control circuits of the radial magnetic bearings to have a gain maximum at least at the first harmonic of the speed of spindle rotation.

* * * * *